United States Patent
Kawashima et al.

(10) Patent No.: US 6,201,569 B1
(45) Date of Patent: Mar. 13, 2001

(54) APPARATUS AND METHOD FOR CONTROLLING VIDEO DISPLAY BLANKING SIGNALS

(75) Inventors: Toshiyuki Kawashima, N. Huntingdon, PA (US); Mie Tomiuka; Tatsuya Watanabe, both of Toyko (JP); Shigeyuki Sano, Yokohama (JP)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 08/868,572

(22) Filed: Jun. 4, 1997

(51) Int. Cl.⁷ ................................................. H04N 17/00
(52) U.S. Cl. .......................... 348/190; 348/745; 348/807
(58) Field of Search .................................. 348/190, 191, 348/745, 746, 748, 807, 181, 806, 189; 358/60, 180; 315/368.12; 382/100; H01J 29/51; H04N 17/00; G09G 5/12

(56) References Cited

U.S. PATENT DOCUMENTS

| | | | |
|---|---|---|---|
| 4,857,998 | * 8/1989 | Tsujihara et al. | 358/60 |
| 4,999,703 | * 3/1991 | Henderson | 358/60 |
| 5,345,280 | * 9/1994 | Kimura et al. | 348/745 |
| 5,473,391 | * 12/1995 | Usui | 348/746 |
| 5,532,764 | * 7/1996 | Itaki | 348/745 |
| 5,550,598 | * 8/1996 | Itoh et al. | 348/807 |
| 5,576,774 | * 11/1996 | Hosoi et al. | 348/745 |
| 5,602,932 | * 2/1997 | Macdonald et al. | 382/100 |
| 5,694,181 | * 12/1997 | Oh | 348/807 |
| 5,742,698 | * 4/1998 | Minami et al. | 382/100 |
| 5,790,210 | * 8/1998 | Kim et al. | 348/807 |
| 5,883,476 | * 3/1999 | Noguchi et al. | 315/368.12 |

* cited by examiner

Primary Examiner—Sherrie Hsia
(74) Attorney, Agent, or Firm—Frommer Lawrence & Haug, LLP.; William S. Frommer; Bruno Polito

(57) ABSTRACT

A system and method for controlling a video display blanking signal so as to maintain a full display screen while minimizing interference with the displayed picture. To control the blanking signal one or more photosensors are placed at the periphery of the display screen. When a CRT overscans the screen at a sensor's location, the light from the CRT is incident on the sensor and the sensor generates a signal proportional to the amount of incident light. The sensor signal is used to adjust the CRT scan such that the CRT scan covers the screen but does not degrade the displayed picture.

4 Claims, 9 Drawing Sheets

APPARATUS AND METHOD FOR CONTROLLING VIDEO DISPLAY BLANKING SIGNALS

FIELD OF THE INVENTION

This invention relates to video displays, and more particularly to the monitoring and controlling of video display blanking signals for the purpose of improved display performance.

BACKGROUND OF THE INVENTION

In the field of video displays, the practice of "overscanning" to insure that the picture fills the screen is well known. To illustrate the practice of overscanning, the practice's application in rear projection color television is considered. In a typical rear projection color television, as in many types of video displays, pictures are formed on a screen by combining multiple beams of light. Usually, a set includes three cathode ray tubes (CRTs), one for each of the primary colors—red, blue and green. The set combines the three monochromatic beams emanating from the CRTs to produce full color television pictures.

Figure 1:
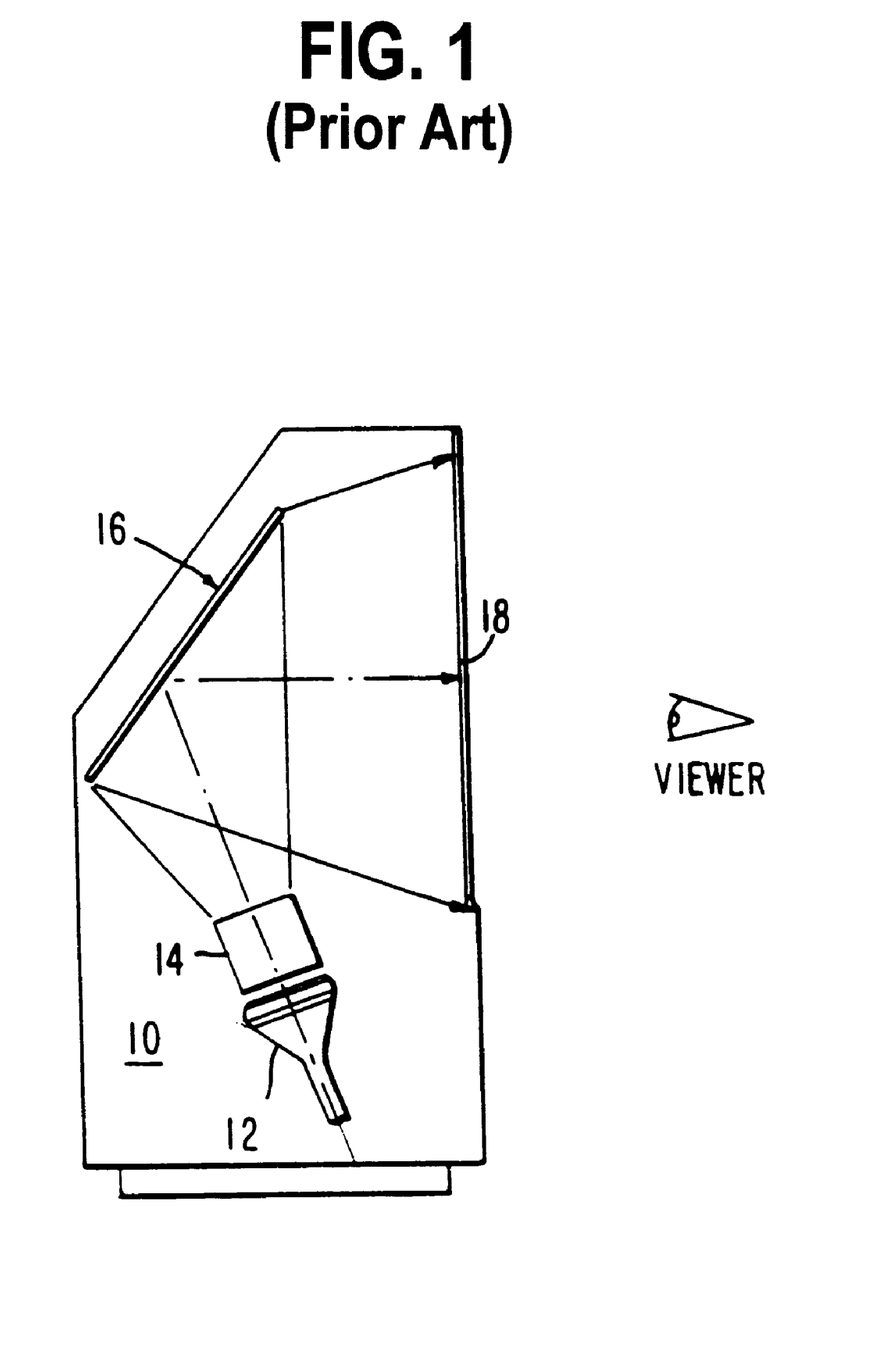
FIG. 1 is a plan view of a typical rear projection television set.
Figure 2:
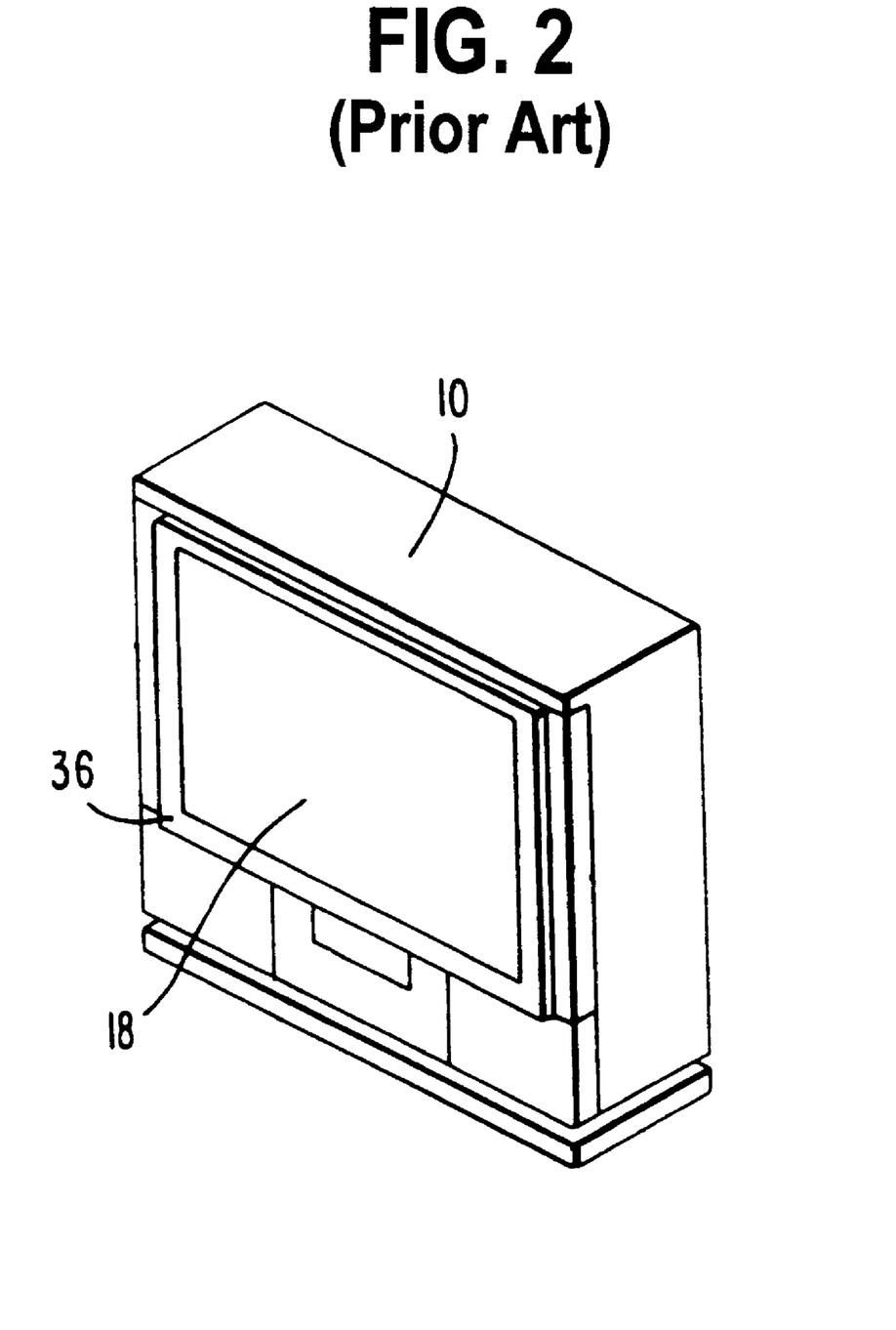
FIG. 2 is an isometric view of the television set shown in FIG. 1.

FIG. 1 is a plan view of a typical rear projection television set. The components of the set are housed within a cabinet 10, and they include: a CRT 12, a lens 14, a mirror 16, and a screen 18. In actuality, the model set includes three CRTs and multiple lenses for each CRT, although for clarity, only the single CRT and the single lens are shown in the figure. The light from the CRT passes through the lens and illuminates the mirror which, in turn, reflects the light onto the screen for observation by the viewer. The screen is secured within the cabinet with the aid of a frame. FIG. 2 is an isometric view which shows the position of a frame 36 relative to the cabinet and screen.

Figure 3:
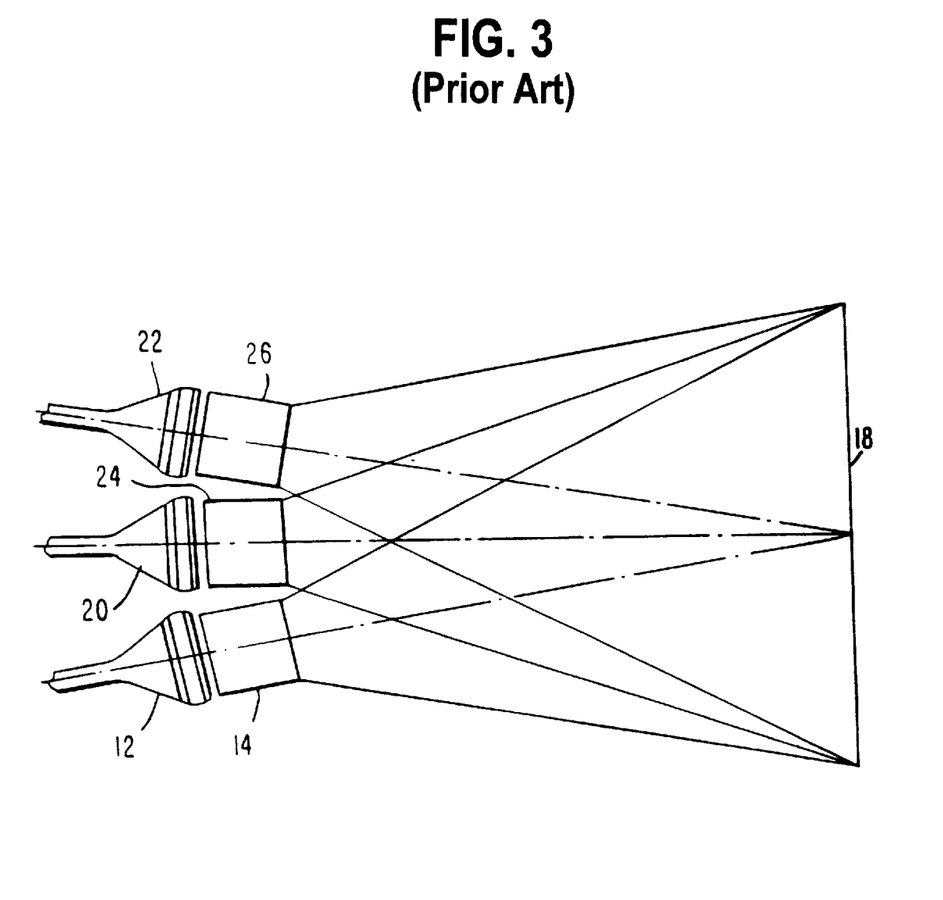
FIG. 3 is a diagram showing the relationship between the three CRTs and the screen for the set shown in FIGS. 1 and 2.

FIG. 3 illustrates the relationship between the three CRTs of the typical set. As can be seen from the figure, CRTs 12, 20 and 22 are matched respectively with lenses 14, 24 and 26, and the CRTs are aligned so that their beams converge. The practice of overscanning concerns what happens when the CRT beams are scanning toward the edge of the screen.

Figure 4:
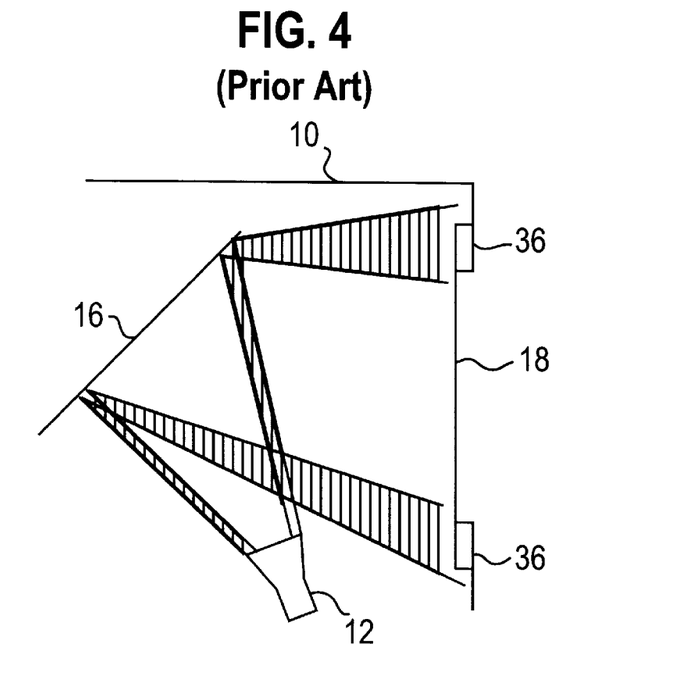
FIG. 4 is a diagram illustrating the principle of overscanning.

FIG. 4 is a diagram that shows what happens when a CRT scan reaches the edge of the screen. Notably, the scan does not stop but continues on so that light emitted from the CRT is incident on the frame. That portion of the television picture signal that corresponds to the overscanned CRT emissions, and the overscanned CRT emissions themselves, are commonly referred to as the "blanking signal".

Figure 5:
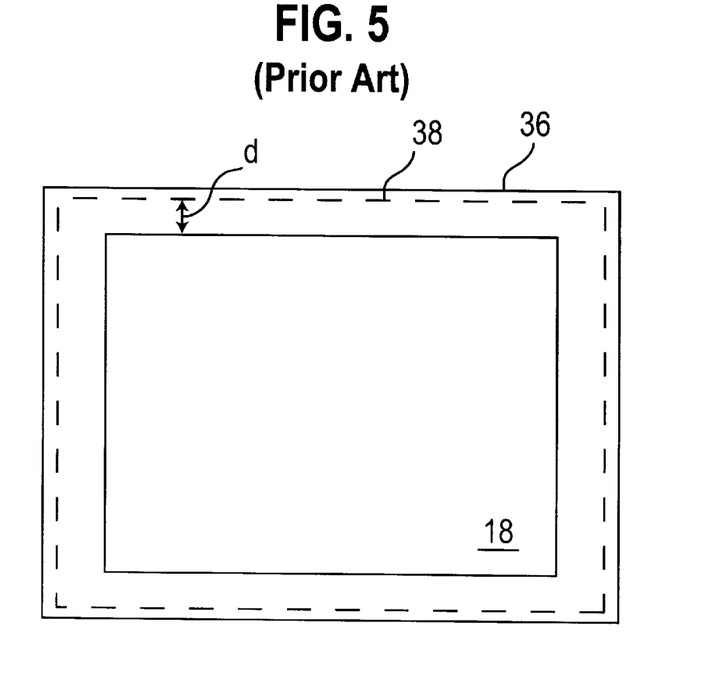
FIG. 5 illustrates overscanning from the television viewer's perspective.

FIG. 5 illustrates overscanning from the viewer's perspective. The figure shows an exemplary relationship between an area scanned by the CRT 38, the screen, and the frame. When the CRT beams are properly aligned with the center of the screen, the scanned area shown extends beyond the screen dimensions by a distance "d" in all directions, as shown. Thus, even if the beams were to become misaligned by an amount $\leq d$, the viewer would still see a full display screen.

OBJECTS AND SUMMARY OF THE INVENTION

It has been recognized that although overscanning insures a full display screen, the reflections it causes degrade the displayed picture.

Accordingly, it is an object of the present invention to provide a system and method for controlling a video display blanking signal so as to maintain a full display screen without interfering with the displayed picture.

To control the blanking signal, one or more photosensors are placed at the periphery of the display screen. When a CRT overscans the screen at a sensor's location, the overscanning light from the CRT is incident on the sensor and the sensor generates a signal proportional to the amount of incident light. The sensor signal is used to adjust the CRT scan such that the CRT scan covers the screen but does not unnecessarily overscan. Thereby, insuring a full display screen while minimizing the degradation due to overscanning.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF CERTAIN PREFERRED EMBODIMENTS

Figure 6:
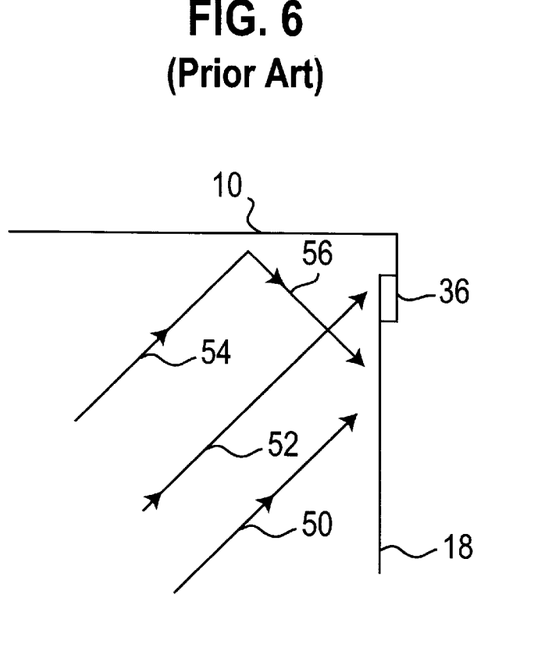
FIG. 6 is an abstract view of prior system overscanning.
Figure 7:
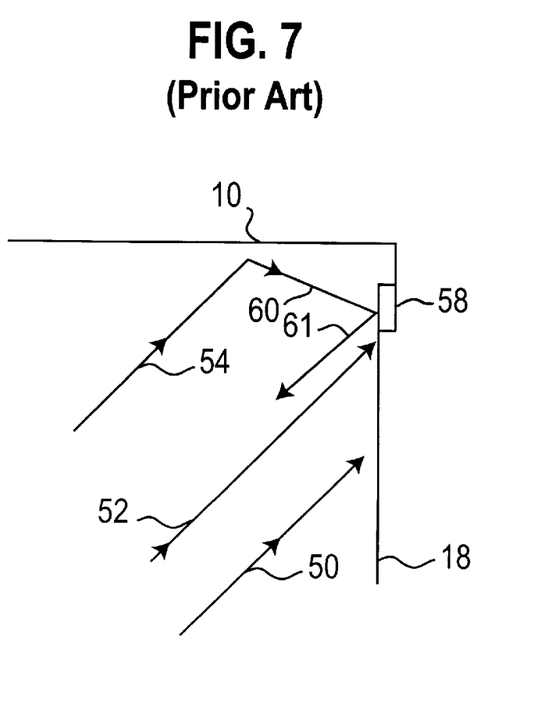
FIG. 7 depicts prior system overscanning in a wide frame system.

FIGS. 6 and 7 illustrate the recognized problems caused by the overscanning techniques of prior systems. FIG. 6 provides an abstract view of the overscanning that occurs at the top edge of the screen in prior systems. Included within the figure are those parts of the cabinet, screen, and frame that are proximate to the top edge of the screen. Rays of light or, alternatively, electron beams (collectively referred to as rays) originating from one or more CRTs are represented by arrows 50, 52 and 54. Rays 50 and 52 strike the screen and form part of the picture, while ray 54 strikes the cabinet. As can be seen from the figure, ray 54 is reflected by the inner surface of the cabinet and gives rise to reflected ray 56. Although, in actuality the reflection will be scattered, ray 54 is meant to depict the general direction of the reflection. In any event, ray 56 strikes the screen and interferes with the displayed picture.

Designers of prior systems have attempted to overcome the problem of interfering reflections by widening the frames of their systems. FIG. 7 depicts a wide frame system. As can be seen from the figure, a wide frame 58 can redirect many potentially interfering reflections away from the screen. In particular, ray 60 is initially reflected toward the screen but then intercepts the wide frame and is reflected away from the screen. However, the wide frame offers only limited protection because it can not account for all reflections within the set, e.g. reflections at angles that do not intercept the frame and re-reflections. Furthermore, widening the frame increases the size of the set, making it bulkier, and possibly less aesthetically pleasing.

Figure 8:
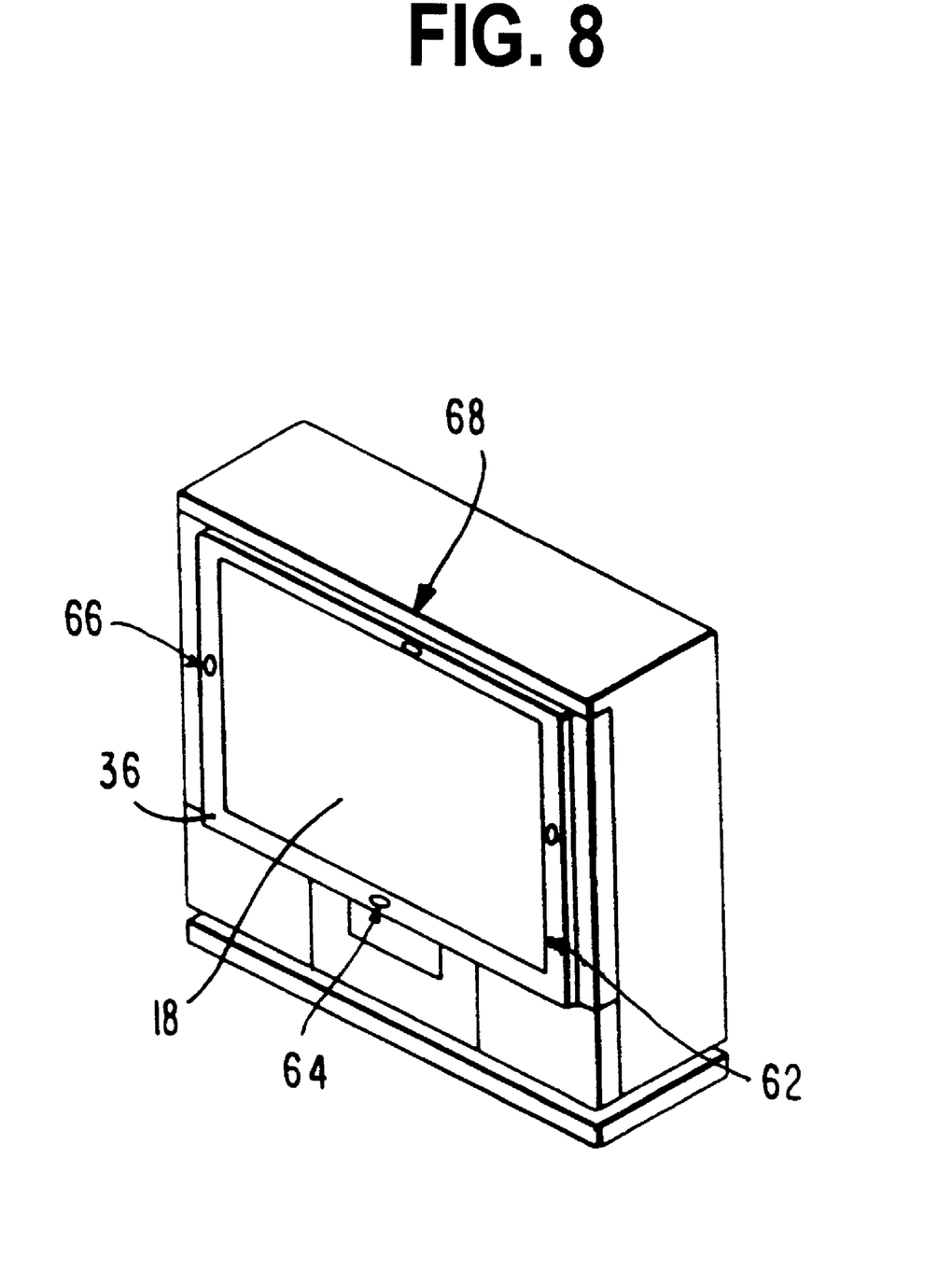
FIG. 8 illustrates a four photosensor embodiment of the invention.

The overscanning problems of prior systems have been recognized and a system and method for alleviating those problems is now provided. In accordance with the present invention, one or more photosensors are included within the video display at the periphery of the display screen. FIG. 8 illustrates a preferred embodiment of the invention in which four sensors, 62, 64, 66 and 68, are employed. In the depicted embodiment the sensors are located behind the frame, thus they are outside the viewable area and do not obstruct the user's view.

Figure 9:
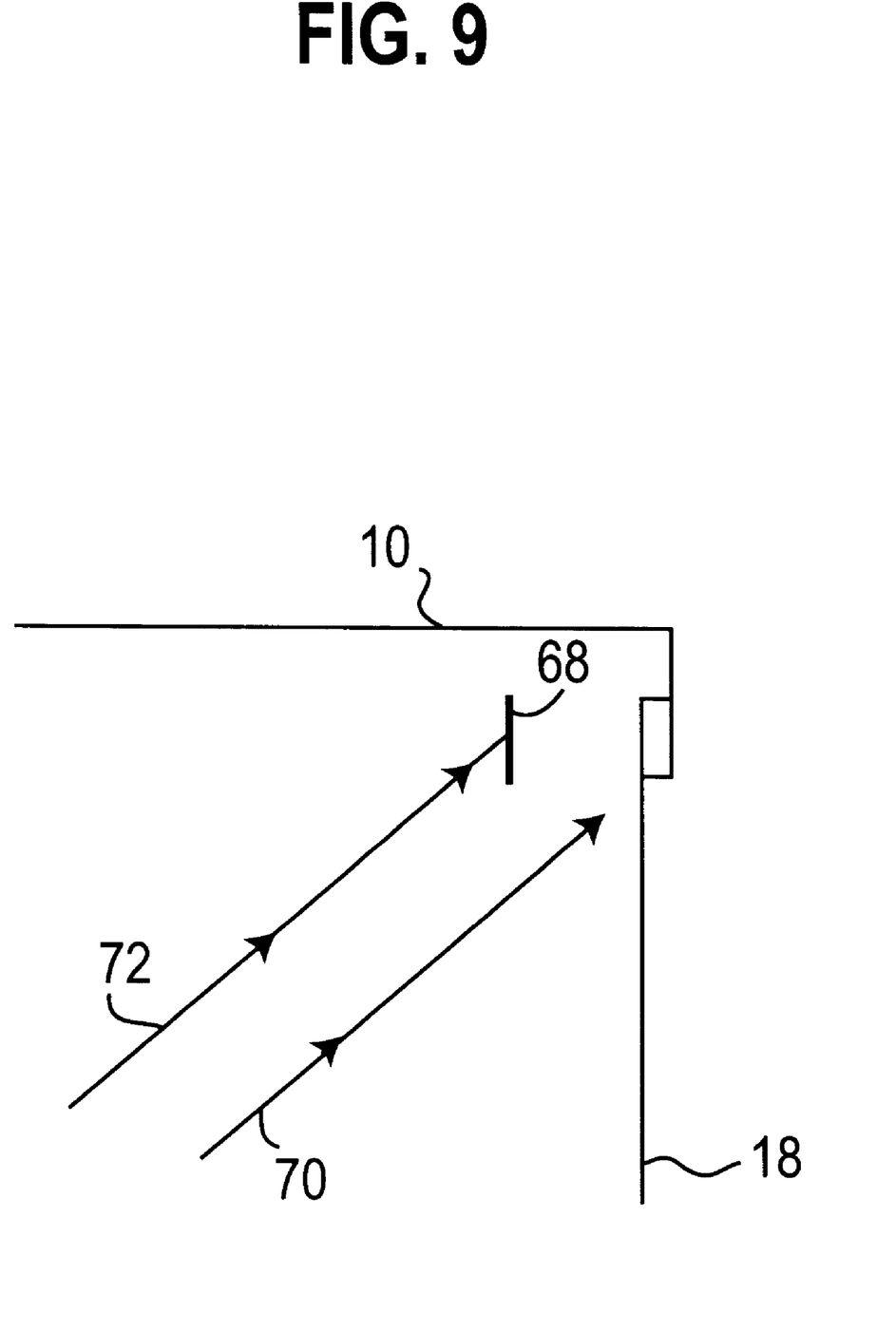
FIG. 9 is a diagram useful in describing the operation of one of the photosensors of FIG. 8.

FIG. 9 is a diagram showing the position of sensor 68 relative to the screen, frame, and cabinet. Rays emanating from the CRT are represented by arrows 70 and 72, with ray 70 representing a ray intended for the screen and ray 72 representing an overscanning ray. The sensor is positioned to intercept any overscanning rays, and therefore, in the figure, it intercepts ray 72. The sensor responds to the ray by generating an overscanning signal. The magnitude of the overscanning signal is proportional to the amount of light (or beam intensity) incident on the sensor, and it therefore increases as the amount of overscanning increases. By adjusting the CRTs to maintain a constant predetermined overscanning signal magnitude it is possible to maintain a constant predetermined amount of overscanning. Preferably, the system is set to overscan by an amount corresponding to the minimum detectable overscanning signal. In this manner some overscanning is assured so that the screen remains full, but unnecessary overscanning is minimized.

The procedure discussed in connection with FIG. 9 is repeated at each sensor shown in FIG. 8. Accordingly, the system of FIG. 8 should efficiently maintain proper overscanning in both the horizontal and vertical screen directions. Nevertheless, it should be noted that any number of sensors may be employed, and so the number employed may be chosen to fit the application.

Figure 10:
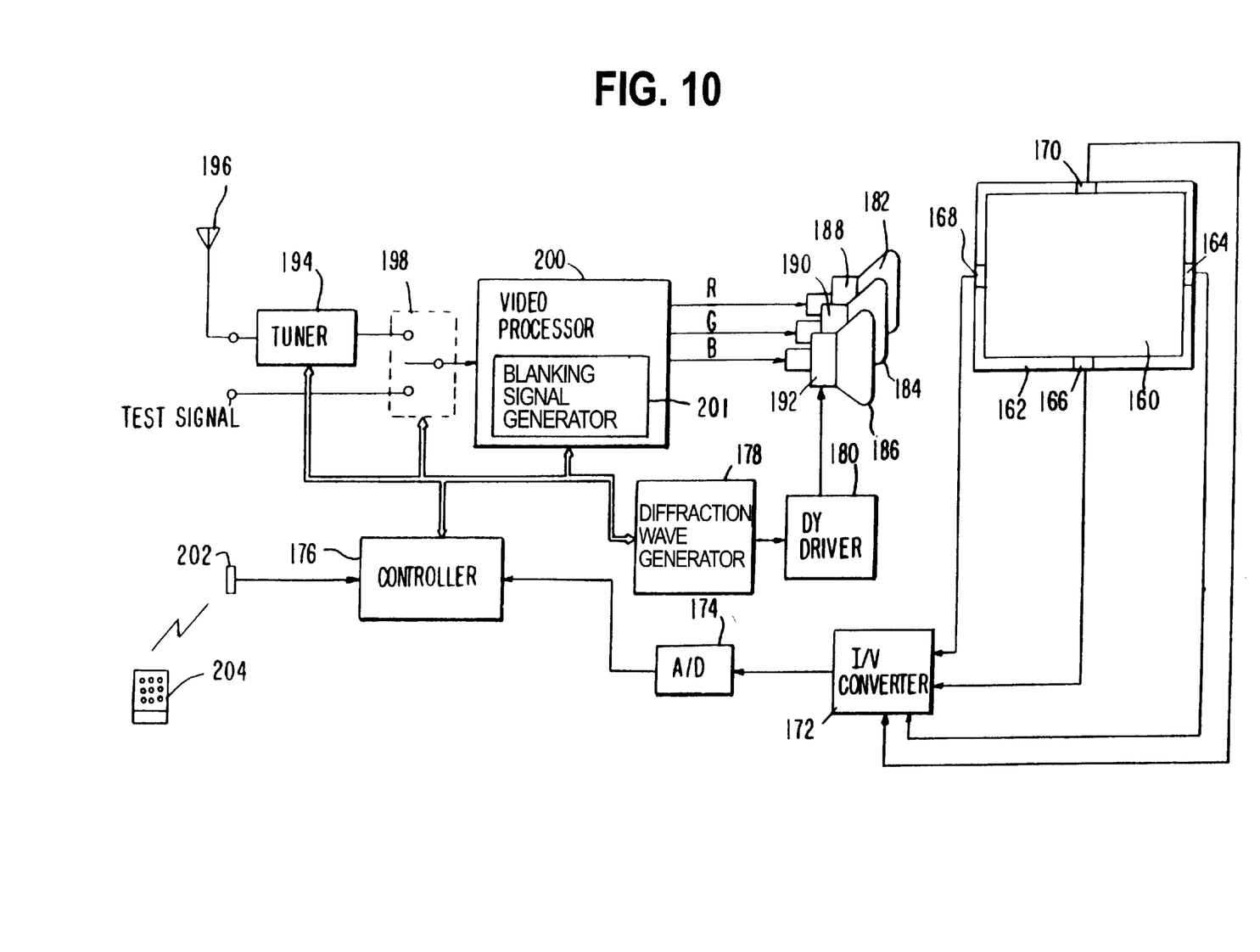
FIG. 10 is a schematic diagram of a television system according to the invention.

A schematic diagram of a television system according to the invention is shown in FIG. 10. The system includes a television screen 160 and three CRTs 182, 184 and 186 for forming images on the screen. Each CRT emits a beam of monochromatic light in one of the primary colors (red, blue and green), and each includes a deflection yoke, 188, 190 and 192, respectively. The scanning pattern of the CRTs is controlled by a video processor 200. Accordingly, the video processor includes a blanking signal generator 201 for generating the blanking signal used during overscanning. A deflection yoke driver 180 is responsive to the video processor, and it is the element that physically deflects the CRT beams.

The overscanning signals which the system acts upon are generated by four peripheral photosensors 164, 166, 168 and 170. The sensors are located behind a screen frame 162 and in the path of overscanning rays. When light from overscanning rays is incident on the sensor, the sensor responds by generating an analog current signal, the analog current signal generated by each sensor being proportional to the amount of light incident on the sensor. The analog current signals from each sensor are passed to a current to voltage converter 172 where they are converted to analog voltage signals. The analog voltage signals are, in turn, relayed to an A/D converter 174. The A/D converter receives the analog voltage signals, converts them to digital voltage signals, and passes the digital voltage signals to a controller 176. The controller then uses the digital voltage signals to perform the convergence calculations and determine the amount of any necessary beam alignment corrections. If correction is required, the controller sends appropriate correction signals to a diffraction wave generator 178. The correction signals received by the diffraction wave generator are converted into driver signals which are passed to the diffraction yoke driver. The driver then generates one or more deflection yoke control signals and applies them to the CRT deflection yokes. Through repeated beam adjustment by way of the deflection yokes, proper beam alignment is maintained.

In addition to the above-identified elements, the television system of FIG. 10 includes a tuner 194, an antenna 196, a switch 198, and an infrared receiver 202. The tuner is used for receiving television signals, such as broadcast signals, through the antenna. These signals are coupled to the video processor by switch 198. However, the switch may deselect the tuner in favor of a test signal for purposes of testing the system. Infrared receiver 202 is provided to allow for remote control of the system via remote control unit 204.

In another preferred embodiment of the invention, the photosensors used for monitoring and controlling overscanning are the same as those used for preforming CRT convergence testing. As mentioned in U.S. Pat. No. 5,923,366—entitled "Apparatus and Method for Calibrating Video Displays"—which patent is incorporated herein by reference, photosensors peripheral to the screen and within the scannable area of the CRTs may be used to perform convergence testing (see U.S. Pat. No. 5,923,366 col. 1, line 34–col. 3, line 2; and col. 4, line 19–col. 7, line 8). In accordance with the present invention, when the peripheral photosensors disclosed in U.S. Pat. No. 5,923,366 are not being used to perform convergence testing, they are used to monitor and control overscanning. Use of convergence sensors for overscanning adjustment requires little if any modification to the system of FIG. 10. In one possible implementation, only the software of controller 176 need by modified. The modification merely involves synchronizing the timing of convergence calculations and overscanning calculations according to the system's requirements.

Figure 11:
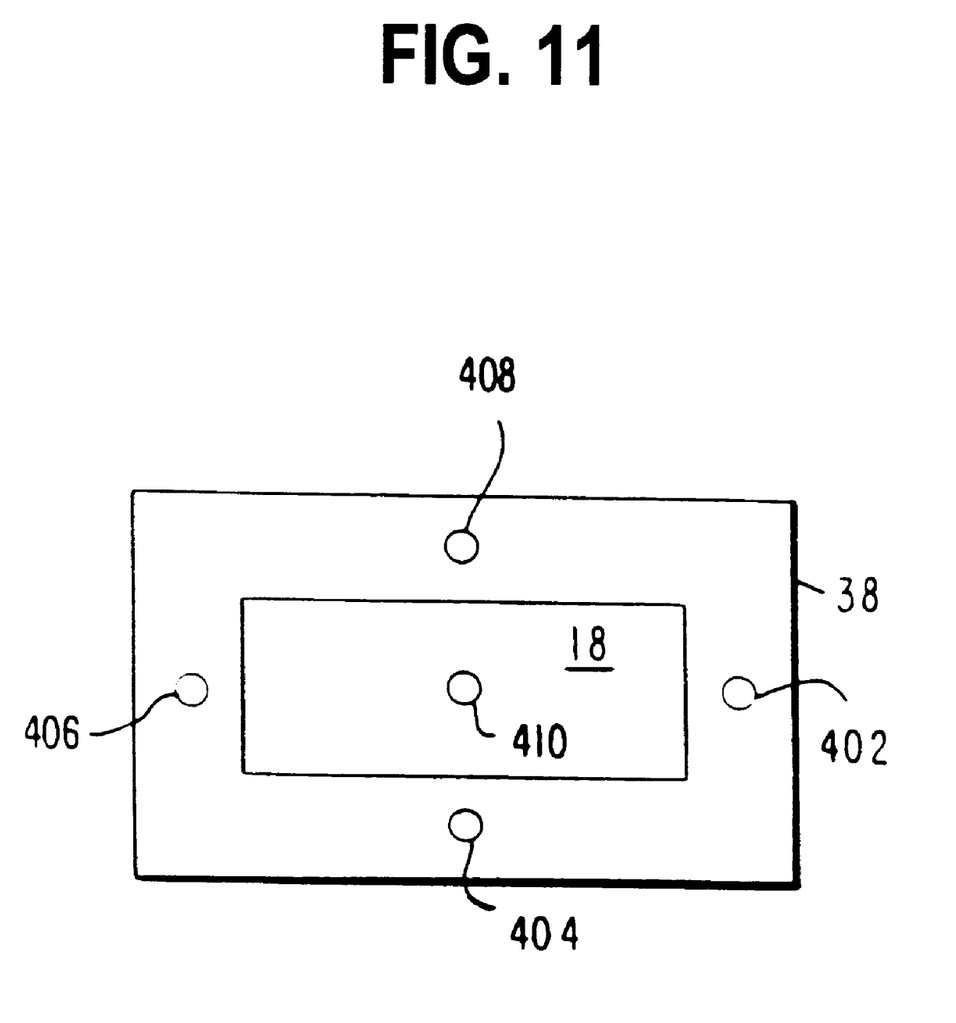
FIG. 11 shows the relationship between sensors, display screen, and scannable area for an alternative sensor arrangement in accordance with the invention.

While the present invention has been particularly shown and described in conjunction with preferred embodiments thereof, it will be readily appreciated by those of ordinary skill in the art that various changes may be made without departing from the spirit and scope of the invention. For example, the invention is not limited to the sensor arrangements described above and many alternative sensor arrangements are possible. One such alternative sensor arrangement is shown in FIG. 11. In the FIG. 11 configuration, five sensors are employed, 402–410, sensor 410 being located at the center of the screen. All five of the sensors are used during convergence testing, while only the peripheral sensors (402–408) are used during overscanning adjustment.

Moreover, the invention is applicable to many types of video displays and is not limited to rear projection television sets. For example, the invention may be employed in computer system monitors.

Therefore, it is intended that the appended claims be interpreted as including the embodiments described herein as well as all equivalents thereto.

What is claimed is:

1. Apparatus for monitoring and controlling overscanning in a system that generates a video display by scanning multiple beams across a screen, comprising:

at least one sensor placed at the periphery of the screen, said sensor being positioned so that when any of said beams overscans the screen, an overscanning beam is incident on one or more of said at least one sensor, said overscanning beam causing said one or more of said at least one sensor to generate an overscanning signal in proportion to said incident overscanning beam; and means for adjusting the scanning of said beams in response to said overscanning signal in order to maintain a predetermined amount of overscanning without changing the convergence calibration of the video display.

2. The apparatus according to claim 1, wherein said predetermined amount of overscanning is constant.

3. The apparatus according to claim 2, wherein said predetermined amount of overscanning is the amount of overscanning corresponding to a minimum detectable overscanning signal.

4. The apparatus according to claim 1, wherein said at least one sensor is a sensor which is used for performing convergence calibration of the multiple beams in an operation that is independent of adjusting the scanning of said beams in response to said overscanning signal.

* * * * *